United States Patent
Oswald

(10) Patent No.: US 10,442,077 B1
(45) Date of Patent: Oct. 15, 2019

(54) FIFTH WHEEL RELEASE HANDLE YANKER AND DOOR HANDLE OPENER

(71) Applicant: Thomas J. Oswald, Oak Creek, WI (US)

(72) Inventor: Thomas J. Oswald, Oak Creek, WI (US)

( * ) Notice: Subject to any disclaimer, the term of this patent is extended or adjusted under 35 U.S.C. 154(b) by 0 days.

(21) Appl. No.: 15/915,824

(22) Filed: Mar. 8, 2018

Related U.S. Application Data

(63) Continuation-in-part of application No. 14/800,820, filed on Jul. 16, 2015, now Pat. No. 9,956,685, which is a continuation of application No. 13/459,154, filed on Apr. 28, 2012, now Pat. No. 9,095,969.

(60) Provisional application No. 61/520,947, filed on Jun. 18, 2011.

(51) Int. Cl.
*B25F 1/00* (2006.01)
*B25J 1/04* (2006.01)

(52) U.S. Cl.
CPC .. *B25J 1/04* (2013.01); *B25F 1/00* (2013.01)

(58) Field of Classification Search
CPC .......................................................... B25J 1/04
USPC .......................................................... 294/175
See application file for complete search history.

(56) References Cited

U.S. PATENT DOCUMENTS

| | | | |
|---|---|---|---|
| 1,716,232 A * | 6/1929 | Kantor | B65G 7/12 294/175 |
| 1,806,261 A * | 5/1931 | Lawlor | E05F 9/00 294/175 |
| 3,038,752 A * | 6/1962 | Bergman | A22B 7/005 104/89 |
| 3,644,951 A | 2/1972 | Colburn | |
| RE28,879 E | 6/1976 | Verest | |
| 4,251,089 A | 2/1981 | Skaggs | |
| 4,531,274 A | 7/1985 | Sanders | |
| 4,776,361 A * | 10/1988 | Staton | A45B 3/00 135/65 |
| D311,482 S | 10/1990 | Morton | |
| 5,065,488 A | 11/1991 | Chapman et al. | |
| 5,271,115 A * | 12/1993 | Senters | B60T 17/221 7/100 |
| 5,344,201 A | 9/1994 | Offin | |
| 5,423,567 A * | 6/1995 | Upton | B62D 53/08 254/129 |
| D370,605 S | 6/1996 | Schimeneck et al. | |
| 5,626,063 A * | 5/1997 | Kosbab | B25B 33/00 254/131 |
| D384,253 S | 9/1997 | Patino | |
| D424,901 S * | 5/2000 | Landry | D8/107 |
| D475,258 S | 6/2003 | Wilson | |
| 6,634,620 B2 | 10/2003 | Sim | |

(Continued)

*Primary Examiner* — Paul T Chin
(74) *Attorney, Agent, or Firm* — Quarles & Brady LLP

(57) ABSTRACT

A fifth wheel yanker moves a fifth wheel release handle in the sequence needed to operate the release handle in the sequence used by, for example, the Jost brand of fifth wheel Jost fifth wheel safety catch release mechanisms. Also disclosed is a device for releasing a trailer from a tractor and opening a door handle. The device comprises a shaft extending between a first end connected to a handle, and a second end connected to a lever, A hook is connected to the shaft proximate the second end, and the lever points generally opposite the direction of the hook. A tube is connected to the shaft proximate the second end. The tube has a passageway defined by at least one wall and at least one opening.

19 Claims, 11 Drawing Sheets

(56) References Cited

U.S. PATENT DOCUMENTS

| | | |
|---|---|---|
| 7,159,260 B2 | 1/2007 | Hansen |
| 7,347,467 B2 * | 3/2008 | Theobald .......... B62D 53/0857 254/131 |
| 7,634,845 B1 | 12/2009 | Sim |
| 7,699,368 B2 | 4/2010 | Nicol |
| 7,762,529 B1 | 7/2010 | Scott |
| 8,157,283 B1 | 4/2012 | Cook |
| 9,095,969 B1 | 8/2015 | Oswald |

* cited by examiner

FIFTH WHEEL RELEASE HANDLE YANKER AND DOOR HANDLE OPENER

CROSS-REFERENCES TO RELATED APPLICATIONS

This application is a continuation-in-part application of U.S. patent application Ser. No. 14/800,820 filed Jul. 16, 2015, which is a continuation application of U.S. patent application Ser. No. 13/459,154 filed Apr. 28, 2012, now U.S. Pat. No. 9,095,969, which claims priority from U.S. Provisional Patent Application No. 61/520,947, filed Jun. 18, 2011, contents of which are included by reference.

FIELD OF THE INVENTION

The invention is directed toward the field of tractor-trailer disengagement devices, and more particularly to a device which aids in the release of Jost brand fifth wheel safety-catch latching mechanisms.

BACKGROUND OF THE INVENTION

The fifth wheel of a truck tractor is designed to hook a trailer securely to the tractor. A pin on the trailer slides into a locking mechanism which latches to lock the trailer to the tractor. A release handle is pulled by the trucker to disengage the trailer.

The Jost brand of safety catch release handles, is not simply pulled. Instead, the handle must be raised upward with a force of about twenty pounds, then moved cab-wards, then finally pulled outward to release the trailer. If this sequence is not followed, a notch on the handle snags and prevents accidental or mischievous disengagement. Use of both hands is practically impossible.

Release handles must be used in rain, snow, dark, or storm. The lift-forward- and cabward motion of a Jost release handle can be difficult for even a strong, long-armed trucker to perform. A smaller trucker must wedge himself or herself under the trailer, which is hazardous in slippery weather.

The Occupational Safety and Health Administration (OSHA) Technical Manual "Evaluation of Lifting Tasks: NIOSH Work Practice Guide for Manual Lifting," provides a formula for two-handed lifting, which results in a maximum of approximately ten pounds maximum lift in the situation above. No OSHA guidance could be found for a single hand, but it quite reasonably would be lower. Thus, the Jost release handle may require a lifting force far in excess of OSHA guidance.

Examples of many release handle aids are found in the prior art. U.S. Pat. No. 6,935,664 granted Aug. 30, 2005, discloses a foot-operated release lever aid. U.S. Pat. No. 4,251,089 issued Feb. 17, 1981, discloses a force-multiplying lever aid. U.S. Pat. No. 7,591,476 issued Sep. 22, 2009, and U.S. Pat. No. 7,347,467 issued Mar. 25, 2008, disclose multi-purpose release mechanisms.

The upward-cabward-outward motion required by the Jost release lever is not addressed by the prior art, which only provided outward pulling.

It is an object of the invention to provide the upward-cabward-outward forces needed to operate a Jost fifth wheel safety catch release mechanism in a compact form.

SUMMARY OF THE INVENTION

The preferred form of the instant invention utilizes a lever and hook in combination with a handle to provide the needed up-cabward-outward motion needed to disengage a Jost fifth wheel.

Also disclosed is a device for releasing a trailer from a tractor and opening a door handle. The device comprises a shaft extending between a first end connected to a handle, and a second end connected to a lever, A hook is connected to the shaft proximate the second end, and the lever points generally opposite the direction of the hook. A tube is connected to the shaft proximate the second end. The tube has a passageway defined by at least one wall and at least one opening.

These and other features, aspects, and advantages of the present invention will become better understood upon consideration of the following detailed description, appended claims and accompanying drawings.

BRIEF DESCRIPTION OF THE DRAWINGS

Like reference numerals will be used to refer to like or similar parts from Figure to Figure in the following description of the drawings.

DETAILED DESCRIPTION OF THE INVENTION

Figure 1:
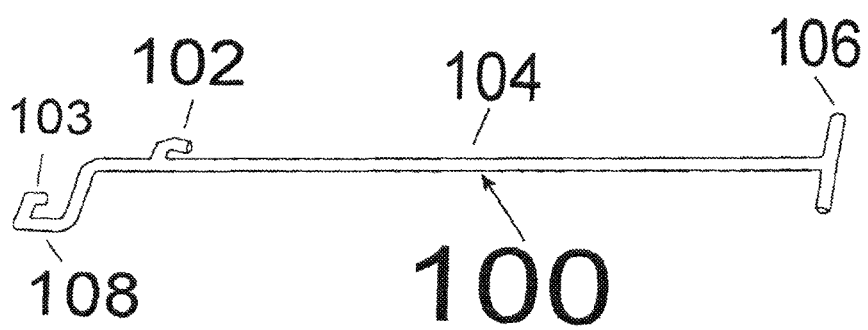
FIG. 1 shows a device for releasing a trailer from a tractor.

Referring to FIG. 1, the device 100 consists of a hook 102 which hooks the release handle of a fifth wheel, a shaft 104 ending in a handle 106 which is gripped by the trucker. A lever 108 points generally opposite the direction of hook 102. A secondary hook 103 is at the end of lever 108. All pieces of the device 100 are preferably made of half-inch steel rod, or similar rod-like material.

Figure 2:
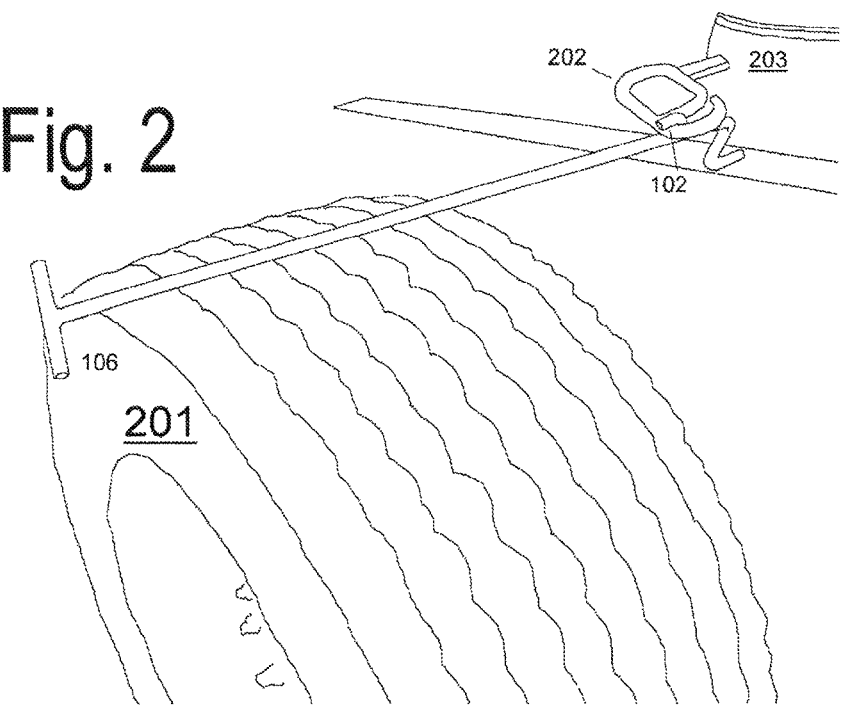
FIG. 2 shows a device for releasing a trailer from a tractor in operational position on the fifth wheel of a truck tractor.

FIG. 2 shows the device in operational position atop tire 201. Hook 102 engages the release handle 202 of the fifth wheel 203.

Figure 3:
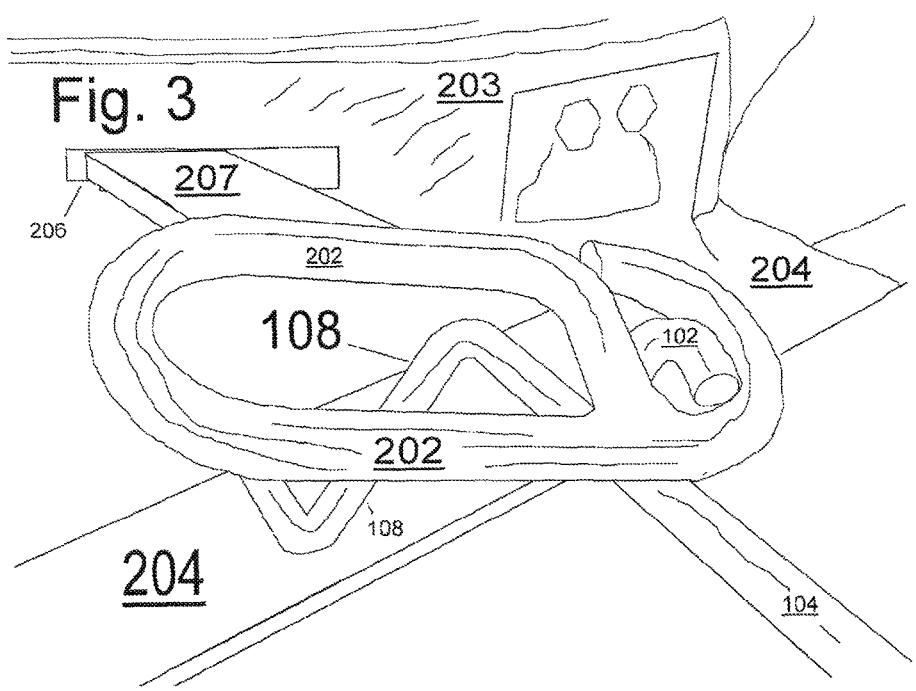
FIG. 3 is a detailed view of the device raising a release handle and moving the handle cabward.
Figure 4:
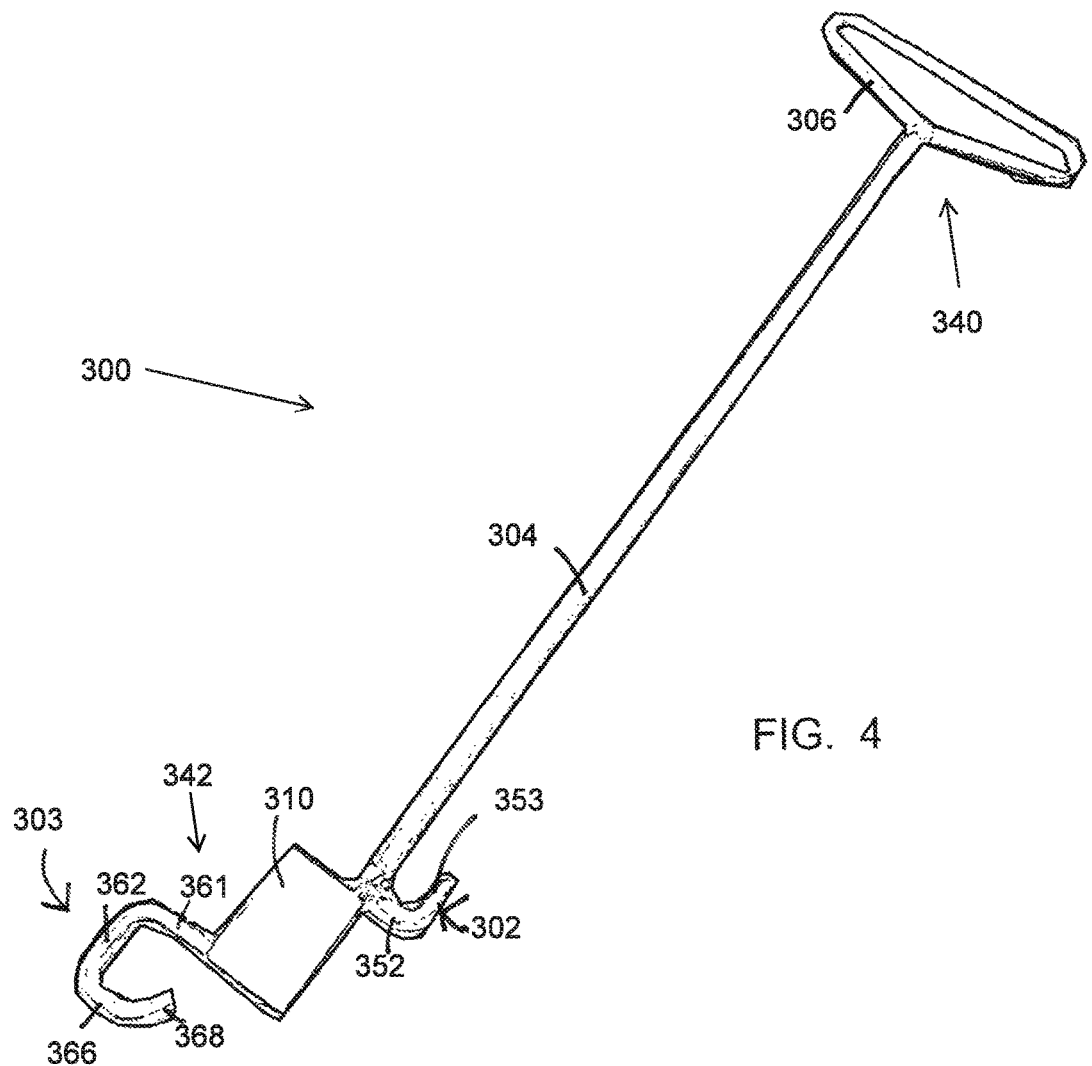
FIG. 4 is a rear side view of a device for releasing a trailer from a tractor and opening a door handle.
Figure 5:
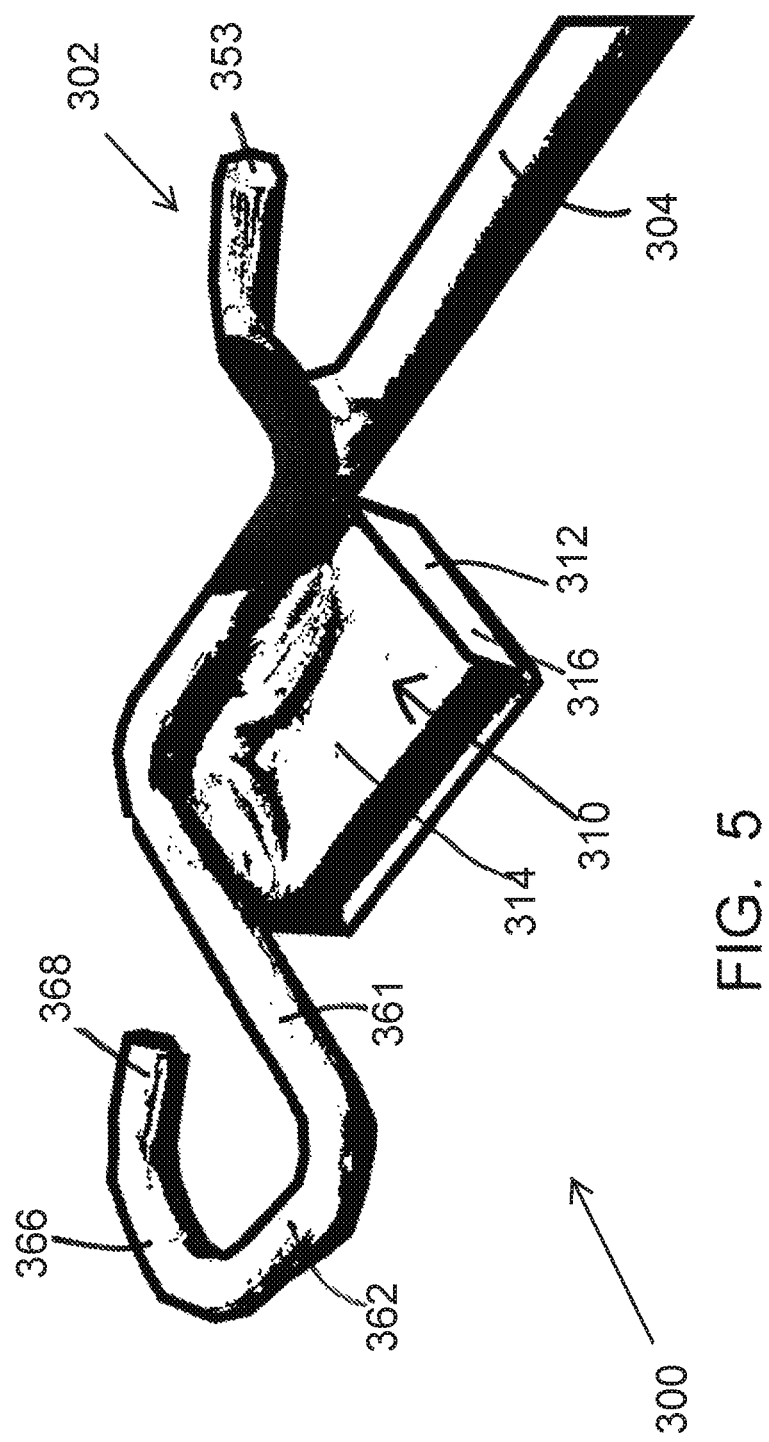
FIG. 5 is a front perspective detailed view of the second end of the device of FIG. 4.
Figure 6:
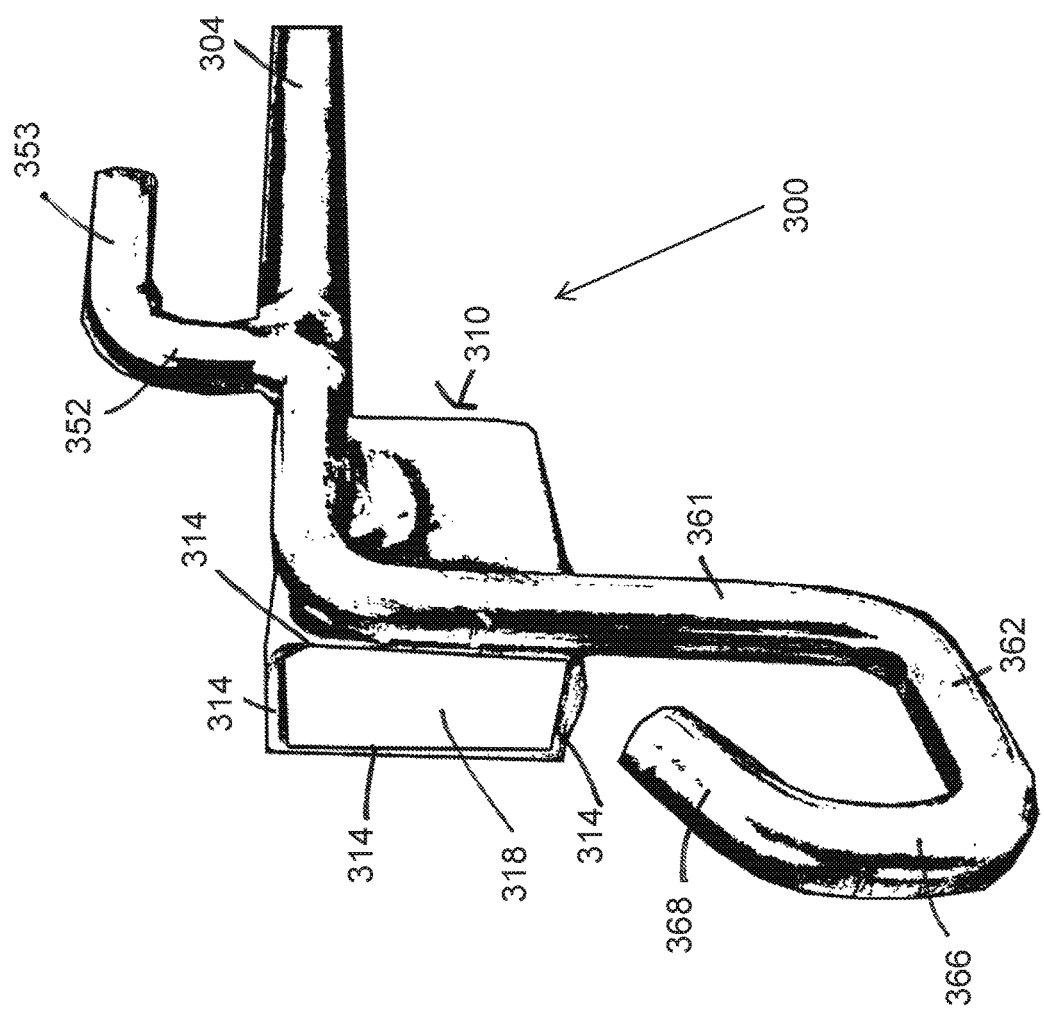
FIG. 6 is a perspective detailed view of the second end of the device of FIG. 4, showing an opening to a passageway of a tube.
Figure 7:
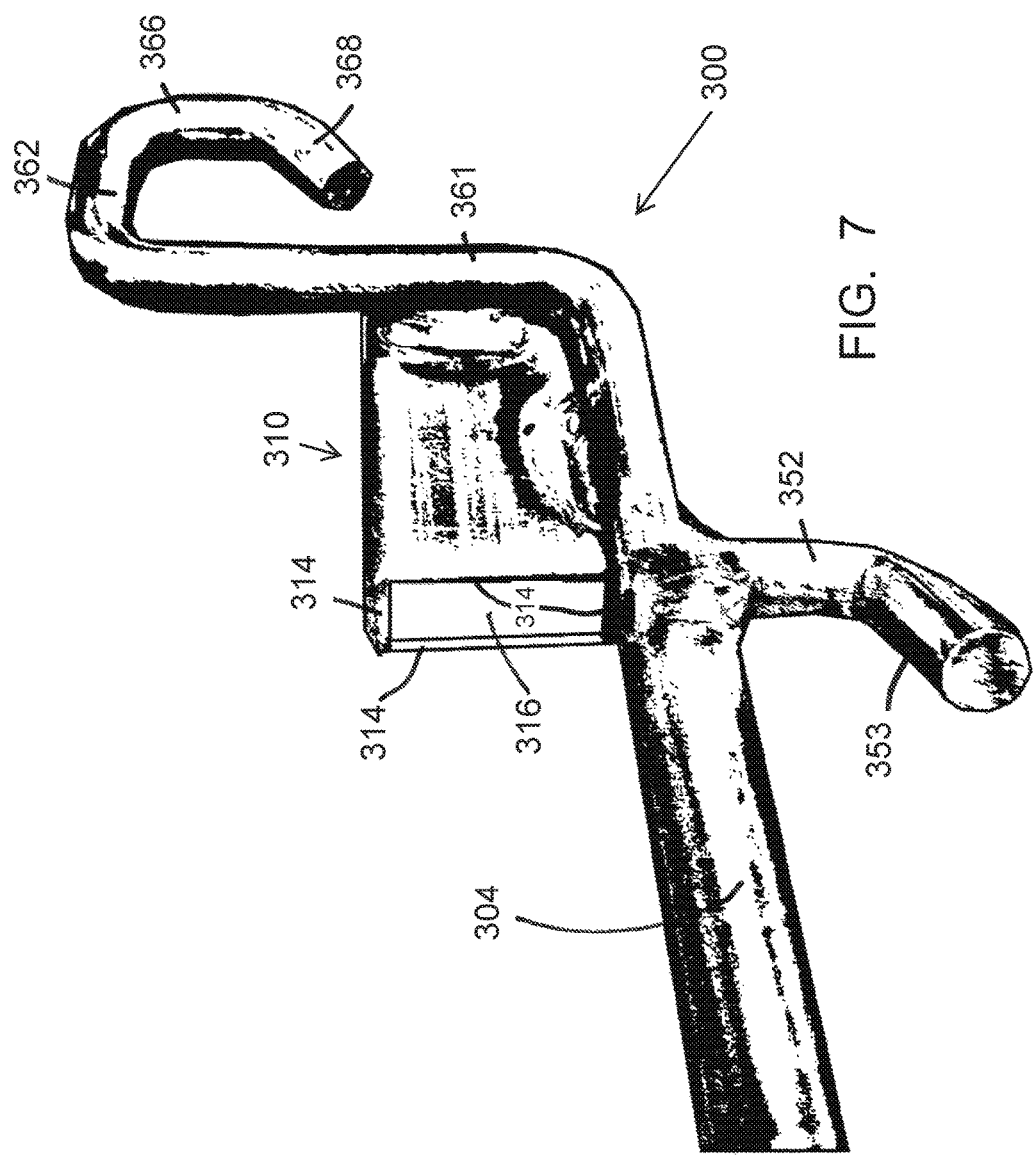
FIG. 7 is a perspective detailed view of the second end of the device of FIG. 4, showing another opening to a passageway of a tube.
Figure 8:
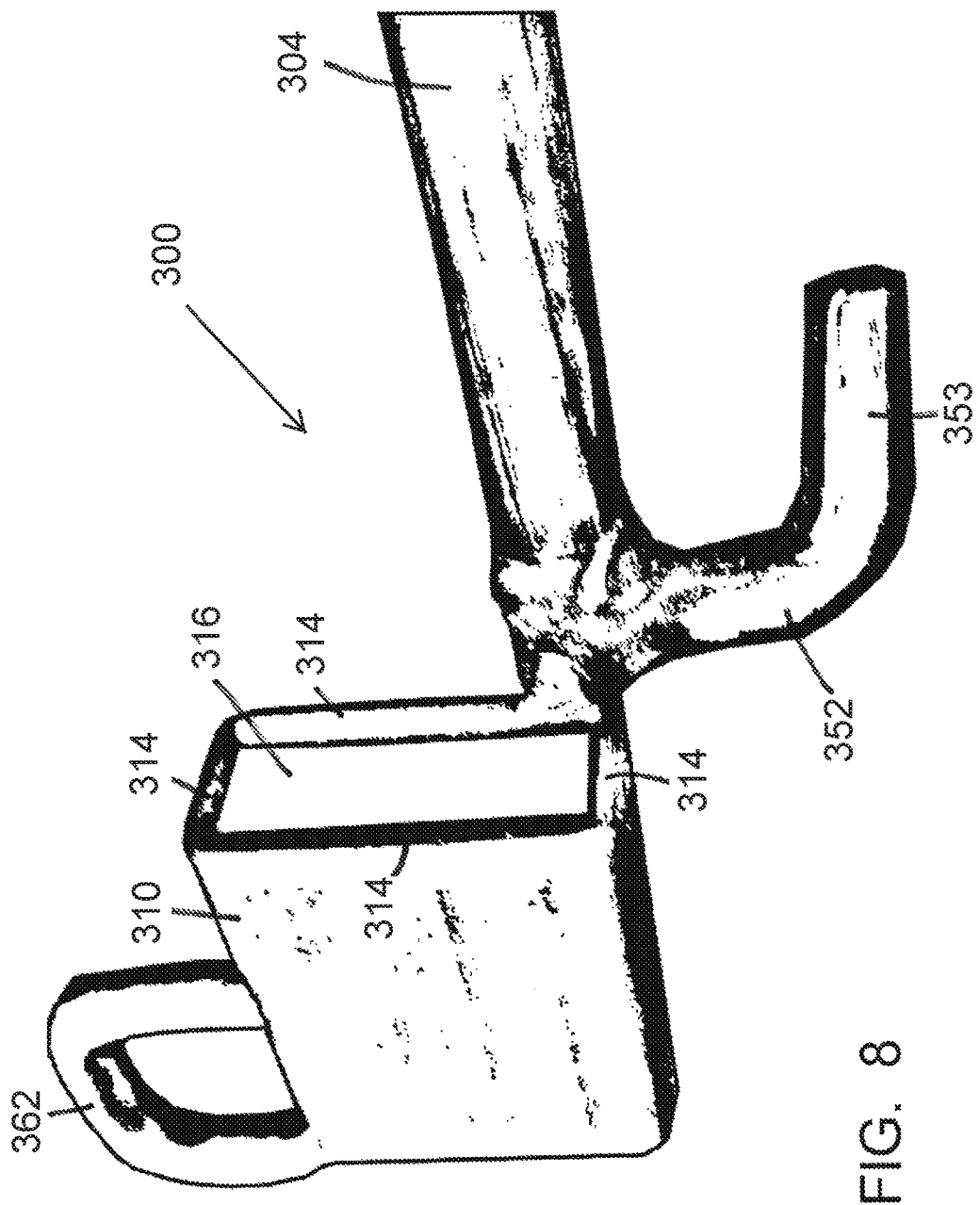
FIG. 8 is a rear perspective detailed view of the second end of the device of FIG. 4, showing an opening to a passageway of a tube.
Figure 9:
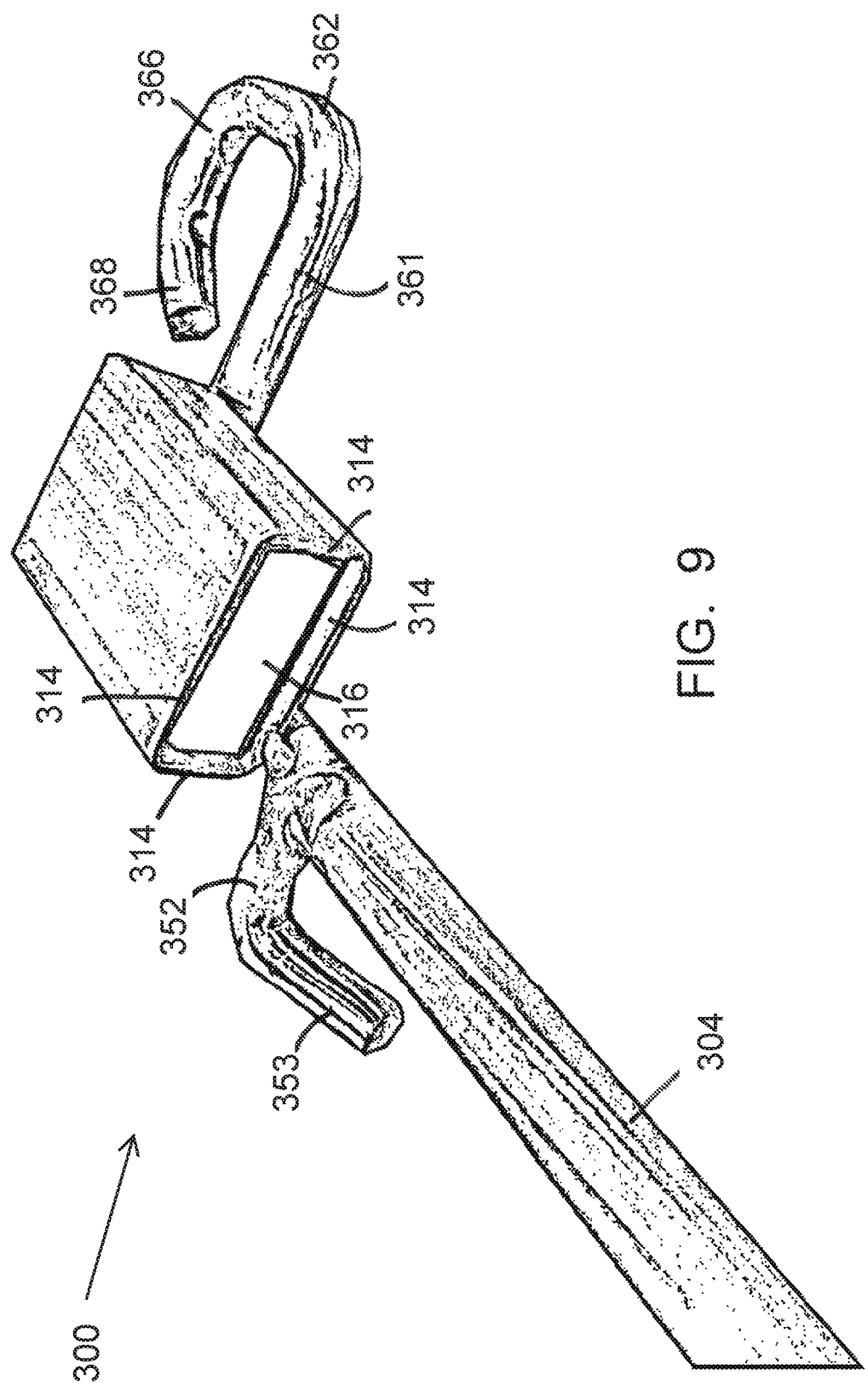
FIG. 9 is another rear perspective detailed view of the second end of the device of FIG. 4, showing an opening to a passageway of a tube.

FIG. 3 shows the lever 108 contacting tractor frame 204, where the frame is the tractor structure under the trailer. By twisting handle 106 (in FIG. 1 or 2) counterclockwise, lever 108 presses upon frame 204 and pushes hook 102 and therefore release handle 202 upward and with further twisting, cabward (the cab is out of view and to the left in this view.) Release handle 202 is welded to release actuator 207, which is urged upward and then cabward onto shelf 206, which holds handle 202 in a position where it can be pulled outward. The trucker then pulls handle 106 outward, releasing the trailer from the fifth wheel 203. Reaching deep under the trailer is avoided, and since the lever 108 is pushing hook 102 upward, rather than the trucker's arm from a distance, the trucker's biomechanical strain is reduced. For non-Jost brand release handles requiring a simple pulling action, secondary hook 103 (in FIG. 1) may be used.

Turning now to FIGS. 4-11, there is shown a device 300 that can be used for disengaging a Jost fifth wheel and for opening the door handle of an intermodal container. The device 300 includes a tube 310 mounted on the end of a shaft 304. The tube 310 may be connected to only the shaft 304, or, in other examples, it may be connected to the shaft 304 and the lever 303. The tube has a passageway 312 defined by at least one wall 314 with a first opening 316. The tube may also include a second opening 318, concentric with the first opening 316. The passageway 312 is generally linear and runs parallel to the shaft 304 and is sized so that it may receive the door handle 320 of an intermodal container. The passageway 312 may take a variety of shapes. In one non-limiting example, the passageway 312 may have four walls 314 and have a rectangular cross section. In other examples, the passageway 312 may have a single curved wall have a circular cross section.

The shaft 304 of the device 300 extends between a first end 340 connected to a handle 306, and a second end 342 connected to the lever 303. A hook 302 is connected to the shaft 304 proximate the second end 342. The lever 303 points generally opposite the direction of the hook 302. The hook 302 has a first linear segment 352 and a second linear segment 353 connected to the first linear segment 352. The first linear segment 352 extends orthogonally outward from a surface of the shaft 304, and the second linear segment 353 extends at an angle from the first linear segment 352 toward the handle 306. The second linear segment 353 and a longitudinal axis of the shaft 304 are skew.

The lever 303 has a first linear section 361 extending at a right angle from the second end 342 of the shaft 304, and a second linear section 362 extending at a right angle from the first linear section 361 and parallel to the axis of the shaft 304. The tube 310 is disposed on the shaft 304 so that it is contacting the second end 342 of the shaft 304 and the first linear section 361 of the lever 303. The lever 303 has a third linear section 366 extending at a right angle from the second linear section 362 and parallel to the first linear section 361. The third linear section 366 has a length that is less than a length of the first linear section 361. The lever 303 has a fourth linear section 368 extending from the third linear section 366 and parallel to the second linear section 362. The fourth linear section 368 has a length that is less than a length of the second linear section 362.

Figure 10:
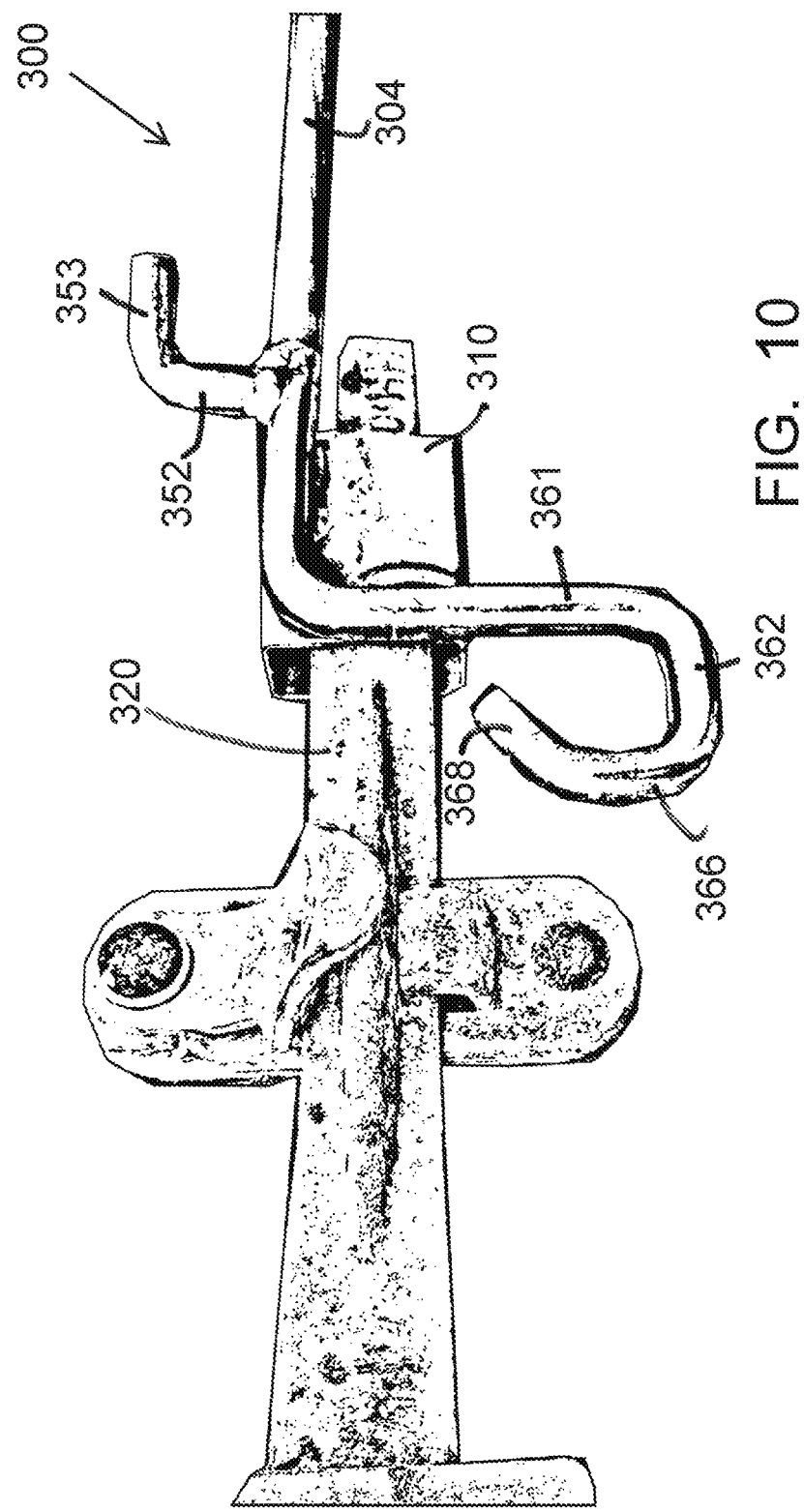
FIG. 10 is a front perspective detailed view of the second end of the device of FIG. 4 being maneuvered to slide the tube onto a door handle of an intermodal container.
Figure 11:
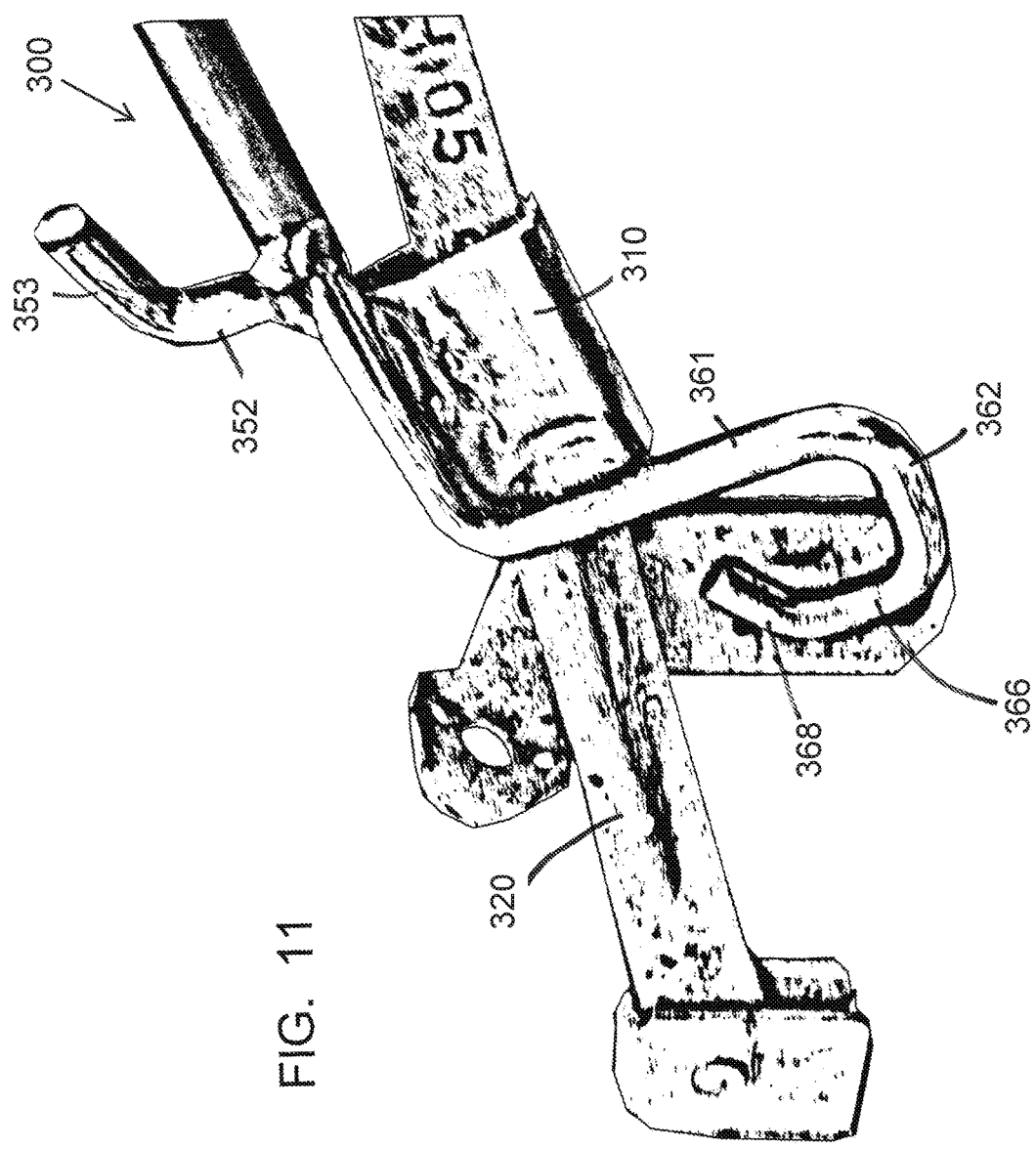
FIG. 11 is a front perspective detailed view of the second end of the device of FIG. 4 lifting and rotating the door handle of the intermodal container, similar to FIG. 10.

Having described the construction of the device 300, the operation of the device 300 can be explained. A device 300 is maneuvered to slide the tube 310 onto the door handle 320 of an intermodal container, receiving the door handle 320 in the passageway 312 as shown in FIGS. 10 and 11. The device 300 is then manipulated to lift and rotate the door handle 320, still in the passageway 312, to unlock the door. The device 300 is then moved to slide the door handle 320 out of the passageway 312. This process may also be reversed to use the device 300 to lock the door handle 320.

The invention is not limited to the embodiments illustrated. For instance, the invention is disclosed as having a counterclockwise twist to urge the release handle upward and cabward, but could be used with a clockwise twist if the release handle were on the right side of the truck. The handle 106 is disclosed as being formed from tubular metal, but a loop of the same material as the shaft would be operable, and could have a more grippable surface, similar to a bicycle handle. The device is disclosed as being made of steel, but other strong materials could be used. These other variants are within the spirit and scope of the claims below.

I claim:

1. A device for releasing a trailer from a tractor and opening a door handle, the device comprising:
    a shaft extending between a first end connected to a handle, and a second end connected to a lever;
    a hook connected to the shaft proximate the second end, the lever pointing generally opposite the direction of the hook;
    a tube connected to the shaft proximate the second end, the tube having a passageway defined by at least one wall and at least one opening; and
    wherein the passageway is sized to receive a door handle.

2. The device of claim 1, wherein the at least one opening comprises a first opening and a second opening which is concentric with the first opening.

3. The device of claim 1, wherein the at least one wall comprises four individual walls oriented so that the passageway is rectangular.

4. The device of claim 1, wherein the hook has a first linear segment and a second linear segment connected to the first linear segment, the first linear segment extending orthogonally outward from a surface of the shaft, and the second linear segment extending at an angle from the first linear segment toward the handle, the second linear segment and the axis of the shaft being skew.

5. The device of claim 1, wherein the lever has a first linear section extending at a right angle from the second end of the shaft, and a second linear section extending at a right angle from the first linear section and parallel to the axis of the shaft.

6. The device of claim 5, wherein the tube is disposed on the shaft so that it is contacting the second end of the shaft and the first linear section of the lever.

7. The device of claim 5, wherein the lever has a third linear section extending at a right angle from the second linear section and parallel to the first linear section.

8. The device of claim 7, wherein the third linear section has a length that is less than a length of the first linear section.

9. The device of claim 7, wherein the lever has a fourth linear section extending from the third linear section and parallel to the second linear section.

10. The device of claim 9, wherein the fourth linear section has a length that is less than a length of the second linear section.

11. The device of claim 1, wherein the tube abuts the second end of the shaft.

12. The device of claim 1, wherein the at least one opening of the tube includes a first opening and a second opening opposite the first opening; and
    the at least one wall of the tube is solid and extends continuously from the first opening to the second opening thereby inhibiting access into the passageway between the first opening and the second opening.

13. The device of claim 1, wherein the passageway is sized to receive a door handle of an intermodal container.

14. A device for releasing a trailer from a tractor and opening a door handle, the device comprising:
    a shaft extending between a first end connected to a handle, and a second end connected to a lever;

a hook connected to the shaft proximate the second end, the lever pointing generally opposite the direction of the hook;

a tube connected to the shaft proximate the second end, the tube having a passageway defined by at least one wall and at least one opening, wherein the at least one wall comprises four individual walls oriented so that the passageway is rectangular.

15. A device for releasing a trailer from a tractor and opening a door handle, the device comprising:

a shaft extending between a first end connected to a handle, and a second end connected to a lever, the lever including:

a first linear section extending at a right angle from the second end of the shaft;

a second linear section extending at a right angle from the first linear section and parallel to the axis of the shaft; and a third linear section extending at a right angle from the second linear section and parallel to the first linear section;

a hook connected to the shaft proximate the second end, the lever pointing generally opposite the direction of the hook; and a tube connected to the shaft proximate the second end, the tube having a passageway defined by at least one wall and at least one opening.

16. The device of claim 15, wherein the third linear section has a length that is less than a length of the first linear section.

17. The device of claim 15 wherein the lever has a fourth linear section extending from the third linear section towards the first linear section.

18. The device of claim 17, wherein the fourth linear section has a length that is less than a length of the second linear section.

19. The device of claim 15, wherein the hook has a first linear segment and a second linear segment connected to the first linear segment, the first linear segment extending orthogonally outward from a surface of the shaft, and the second linear segment extending at an angle from the first linear segment toward the handle, the second linear segment and the axis of the shaft being askew.

* * * * *